US008438618B2

(12) United States Patent
Eldar et al.

(10) Patent No.: US 8,438,618 B2

(45) Date of Patent: May 7, 2013

(54) PROVISIONING ACTIVE MANAGEMENT TECHNOLOGY (AMT) IN COMPUTER SYSTEMS

(75) Inventors: Avigdor Eldar, Jerusalem (IL); Howard C. Herbert, Phoenix, AZ (US); Purushottam Goel, Beaverton, OR (US); Uri Blumenthal, Fair Lawn, NJ (US); David Hines, Phoenix, AZ (US); Carey Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1251 days.

(21) Appl. No.: 11/963,062

(22) Filed: Dec. 21, 2007

(65) Prior Publication Data

US 2009/0165099 A1 Jun. 25, 2009

(51) Int. Cl.
*H04L 29/06* (2006.01)

(52) U.S. Cl.
USPC ............... 726/5; 713/155; 713/156; 713/157; 713/182; 713/184

(58) Field of Classification Search ....................... 726/5
See application file for complete search history.

(56) References Cited

U.S. PATENT DOCUMENTS 5,974,453 A * 10/1999 Andersen et al. ............. 709/220
7,831,997 B2 11/2010 Eldar et al.
2004/0003076 A1* 1/2004 Hishimoto .................... 709/223
2004/0003085 A1* 1/2004 Joseph et al. ................. 709/226
2004/0093381 A1* 5/2004 Hodges et al. ................ 709/204
2004/0230793 A1* 11/2004 Estrada et al. ................ 713/156
2005/0005097 A1* 1/2005 Murakawa .................... 713/156
2005/0283619 A1* 12/2005 Min ............................. 713/182
2006/0039564 A1* 2/2006 Rao .............................. 380/270
2006/0080545 A1* 4/2006 Bagley .......................... 713/183
2006/0143702 A1* 6/2006 Hisada et al. .................. 726/15
2006/0145133 A1* 7/2006 Komarla et al. .................. 257/1
2006/0168196 A1* 7/2006 Herbert et al. ................ 709/224
2007/0136807 A1* 6/2007 DeLiberato et al. ............ 726/22
2007/0174472 A1* 7/2007 Kulakowski .................. 709/229
2007/0283003 A1* 12/2007 Broyles et al. ................ 709/224

OTHER PUBLICATIONS

Hunter, B., Simplifying PKI Usage through a Client-Server Architecture and Dynamic Propagation of Certificate Paths and Repository Addresses, Sep. 2002, 13th International Workshop on Database and Expert Systems Applications DEXA'02, pp. 505-510.*
First Office Action for Chinese Patent Application No. 200810188961.4, Mailed Jan. 10, 2011, 8 pages.
Eldar, Dori, et al., "Configuring Intel Active Management Technology", vol. 12, Issue 04, 12 pages, Dec. 23, 2008.
First Non-Final Office Action for Japanese Patent Application No. 2008-322656 Mailed Aug. 2, 2011, 3 Pages.
Second Office Action for Chinese Patent Application No. 200810188961.4, Mailed Aug. 24, 2011, 8 Pages.

* cited by examiner

*Primary Examiner* — Taghi Arani
*Assistant Examiner* — Kenneth Chang
(74) *Attorney, Agent, or Firm* — Blakely, Sokoloff, Taylor & Zafman LLP

(57) ABSTRACT

Active management technology (AMT) may be provisioned in a client device automatically, which may provide a secure connection between the provisioning server and the client device. The client device comprising the active management technology may support zero-touch provisioning and one-touch provisioning.

19 Claims, 7 Drawing Sheets

START
305 Contact a client device to discover presence of Intel® active management technology AMT
310 Intel® AMT present? NO → END; YES
315 Retrieve the AMT values
320 Send the AMT values
325 Generate One Time Password (OTP)
330 Receive the OTP
335 Enable the AMU to open the network interface to listen to a set-up message
340 Generate a key pair and a self-signed certificate
345 FQDN of the provisioning server available? YES / NO
350 Obtain a domain name service (DNS) suffix of the network
355 Provisioning server opens a mutually authenticated session with AMU
360 Create a mutually-authenticated connection
365 Audit the information of the provisioning server
370 Send a request for the OTP
375 Validate the received OTP
380 Establish a secure connection with the client device
385 Log-in to the client device supporting the AMT
390 Provide the configuration data
395 Client device resets and starts normal operation
END

PROVISIONING ACTIVE MANAGEMENT TECHNOLOGY (AMT) IN COMPUTER SYSTEMS

BACKGROUND

Computer systems may allow provisioning of Intel® active management technology (AMT) to support features such as discovering, healing, and protecting the computer system. While provisioning Intel® active management technology (AMT) in a computer system, the technicians of the corporate IT departments may manually provide configuration values either at the end-user area or the IT staging area.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes provisioning active management technology (AMT) in computer systems. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
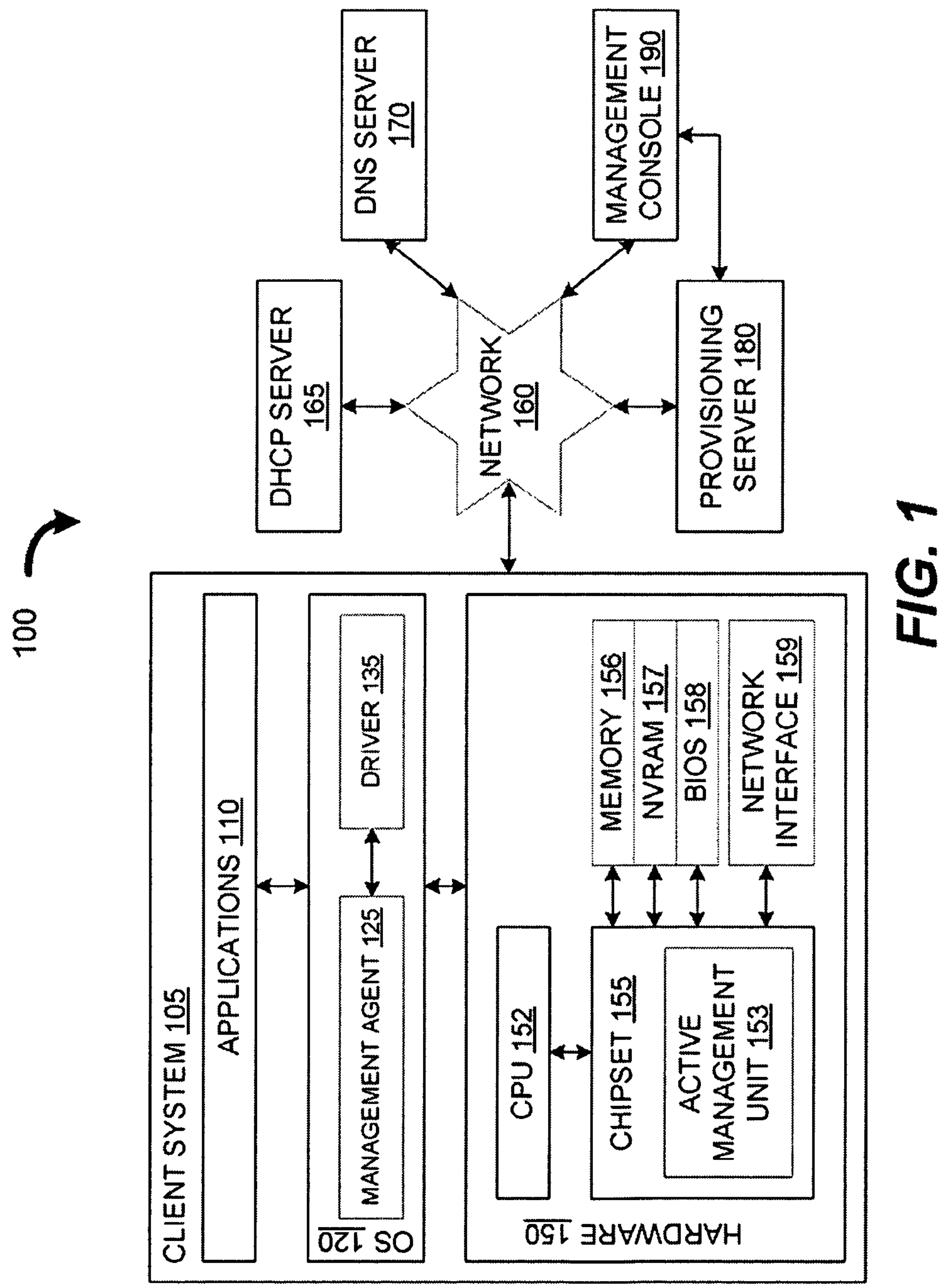
FIG. 1 illustrates an embodiment of an environment 100.

An embodiment of a network environment 100 is illustrated in FIG. 1. In one embodiment, the network environment 100 may comprise a client system 105, a network 160, a dynamic host configuration protocol (DHCP) server 165, a domain name system (DNS) server 170, a provisioning server 180, and a management console 190.

The network 160 may couple computing devices such as the client device 105, DHCP server 165, DNS server 170, provisioning server 180, and the management console 190. The network 160 may comprise network devices such as routers and gateways, which may support transfer of data between the client device 105, DHCP server 165, DNS server 170, provisioning server 180, and the management console 190 over a wired and a wireless medium. In one embodiment, the network devices of the network 160 may support transmission control protocol/internet protocol suites (TCP/IP), user datagram protocol (UDP), and similar other protocol suites.

The DHCP server 165 may assign IP addresses to the computing devices coupled to the network 160 in response to receiving a request from the computing devices. In one embodiment, the DHCP server 165 may provide a domain name the client device 105 may use while resolving the host names via the Domain Name System (DNS). In one embodiment, the DHCP server 165 may dynamically assign IP address to the client device 105 in response to receiving a request from the client device 105. The DHCP server 165 may also provide default gateway, subnet mask, IP address of the client device 105, and such other similar parameters to the client device 105.

The DNS server 170 may translate the domain names into IP addresses. The DNS server 170 may provide contact information of the provisioning server 180 to the client device 105 and of the client device 105 to the provisioning server 180. The DNS server 170 may also support the management server 190 to locate address information of the client device 105.

The management console 190, during the set-up phase, may contact the client device 105 and send an update request to determine whether the client device 105 supports AMT. The management console 190 may receive AMT values from the client device 105 in response to the update request if the client device 105 supports AMT. In one embodiment, the management console 190 may generate a one-time password (OTP) after receiving the AMT values from the client device 105. In one embodiment, the AMT values may comprise universal unique identifier (UUID), AMT version identifier, and such other values. In one embodiment, the AMT values may uniquely identify the client device 105 and indicate whether the client device 105 supports active management technology. In one embodiment, the management console 190 may send the AMT values and the OTP to the provisioning server 180 and the OTP to the client device 105. In one embodiment, the management console 190 may support the client device 105 to locate the provisioning server 180 and the DNS server 170.

The provisioning server 180 may support provisioning of AMT on the client device 105. In one embodiment, the provisioning server 180 may support set-up and configuration application such as the Intel® set-up and configuration services (SCS). In one embodiment, the provisioning server 180 may also receive the AMT values and the OTP from the management console 190 and may store the AMT values and the OTP to ensure that the provisioning server 180 is communicating with the appropriate client device 105. In one embodiment, the provisioning server 180 may use the AMT values and the OTP to authenticate the client device 105. In one embodiment, the provisioning server 180 may receive a hello packet from the client device 105 and may compare the OTP embedded in the hello packet with the OTP stored before authenticating the client device 105. In one embodiment, the provisioning server 180 may send a certificate chain after receiving a self-signed certificate from the client device 105. In one embodiment, the certificate chain may be used to authenticate the provisioning server 180. In one embodiment, the provisioning server 180 may set-up a secure session with the client device 105 after mutual authentication is complete. In one embodiment, the authentication of the provisioning server 180 may avoid a rouge provisioning server authenticating itself as the provisioning server 180.

The client device 105 may support active management technology (AMT) components, which may allow automatic provisioning of active management technology on the client device 105. In one embodiment, the process of setting-up and configuring the active management technology may be referred to as provisioning. The provisioning of active management technology on the client device 105 may enable discovering, healing, and protecting the client device 105 remotely. In one embodiment, the AMT may enable improved asset management, minimal desk-side visits by the technicians of the IT department, improved security levels, remote fault detection, and such other similar features. In one embodiment, the client device 105 may couple with the network 160 through the network interface 159 to interface with the provisioning server 180 and the management console 190.

In one embodiment, the client device 105 may support zero-touch and one-touch provisioning features, which may enable the client system 105 to automatically establish a secure connection with the provisioning server 180. In one embodiment, the zero-touch provisioning feature may enable the client device 105 to provision active management technology, automatically, without the IT technician having to manually configure the client device 105 at the IT staging area and the end user area. In one embodiment, the zero-touch provisioning may be performed using unsecured DNS suffix option or a secured DNS suffix option.

In one embodiment, the unsecured DNS suffix option may refer to a provisioning feature in which the AMT uses the DHCP server to obtain the DNS suffix of the FQDNs of the client devices in that DNS domain. In one embodiment, the FQDNs may be used to identify an appropriate provisioning server in that DNS domain. However, while using the unsecured DNS suffix option, an adversary may take control of the DHCP server and cause the AMT to conclude that the client device 105 is in a DNS domain of the adversary. In one embodiment, the secured DNS suffix option may refer to a provisioning feature in which the FQDN of the provisioning server 180 may be provided to the AMT by the OEM under a purchase contract. In one embodiment, the client device 105 supporting AMT may not contact the DHCP server 150 to identify the provisioning server 180.

In one embodiment, the one-touch provisioning feature may allow configuring the client system 105 at the IT staging area and then be used at the end user area without having to configure the AMT at the end user area. In one embodiment, one-touch provisioning may use a secure DNS option or the provisioning identifier/provisioning pre-shared key or provisioning passphrase (PID/PPS) option. In one embodiment, the PID/PPS may represent security keys, which may used to the provision the AMT. In one embodiment, the one-touch provisioning feature may enable the client system 105 to establish secure connection with the provisioning server 180, automatically, without the IT technician having to manually configure the client device 105 at the end-user area. In one embodiment, the IT staging area may refer to the IT departments of corporate organizations that configure, set-up, track, and repair the computer systems prior to and after issuing the computer systems to end-users.

In one embodiment, the client system 105 may comprise applications 110, an operating system (OS) 120, and a hardware unit 150. In one embodiment, the hardware unit 150 may comprise a central processing unit (CPU) 152, a chipset 155, a memory 156, a NVRAM 157, a BIOS 158, and a network interface 159. In one embodiment, the client device 105 may support zero-touch or remote configuration (RCFG) to remotely initiate a secure and authenticated communication channel between the client device 105 and the provisioning server 180.

The central processing unit 152 may be coupled to the chipset 155, which may allow the CPU 152 to interface with the memory 156, the NVRAM 157, the BIOS 158, and the I/O devices such as the network interface 159. The central processing unit 152 may support the operating system 120, which may manage the resources of the CPU 152 and schedule the applications 110. In one embodiment, the CPU 152 may comprise Intel® family of microprocessors. In one embodiment, the provisioning of AMT may be supported by platforms such as Intel® vPro™ and Intel® Centrino®.

The chipset 155 may comprise active management unit 153, which may support active management technology (AMT). In one embodiment, the chipset 155 may be referred to as an AMT enabled chipset if it supports AMT. In one embodiment, the active management unit 153 may comprise a programmable processing unit such as a management engine (ME) to support the active management technology (AMT). In one embodiment, the active management unit 153 may be supported by other blocks of the hardware 150 such as the CPU 152 or the active management unit 153 may also be provided as a stand-alone component. In one embodiment, the AMT firmware component may be supported by a non-volatile storage such as the NVRAM 157. In one embodiment, the active management unit 153 may execute the firmware code to provision AMT on the client system 105.

In one embodiment, the active management unit (AMU) 153 may support provisioning of Intel® AMT. In one embodiment, the client system 105 may use the zero-touch provisioning or the one-touch provisioning approach to provision the AMT. In one embodiment, the active management unit (AMU) 153 may support delayed provisioning while using zero-touch provisioning approach.

While using delayed provisioning, the AMU 153 may provision the AMT after installing the operating system 120.

In one embodiment, the active management unit (AMU) 153 may use delayed provisioning or bare-metal provisioning while using one-touch provisioning. In one embodiment, the active management unit 153, while using bare-metal provisioning, may provision the AMT before installing the operating system 120. In one embodiment, the active management unit 153 may provision the AMT and the client device 105 may then download the operating system 120 from a remote source over a secure connection established by provisioning the AMT.

Figure 2:
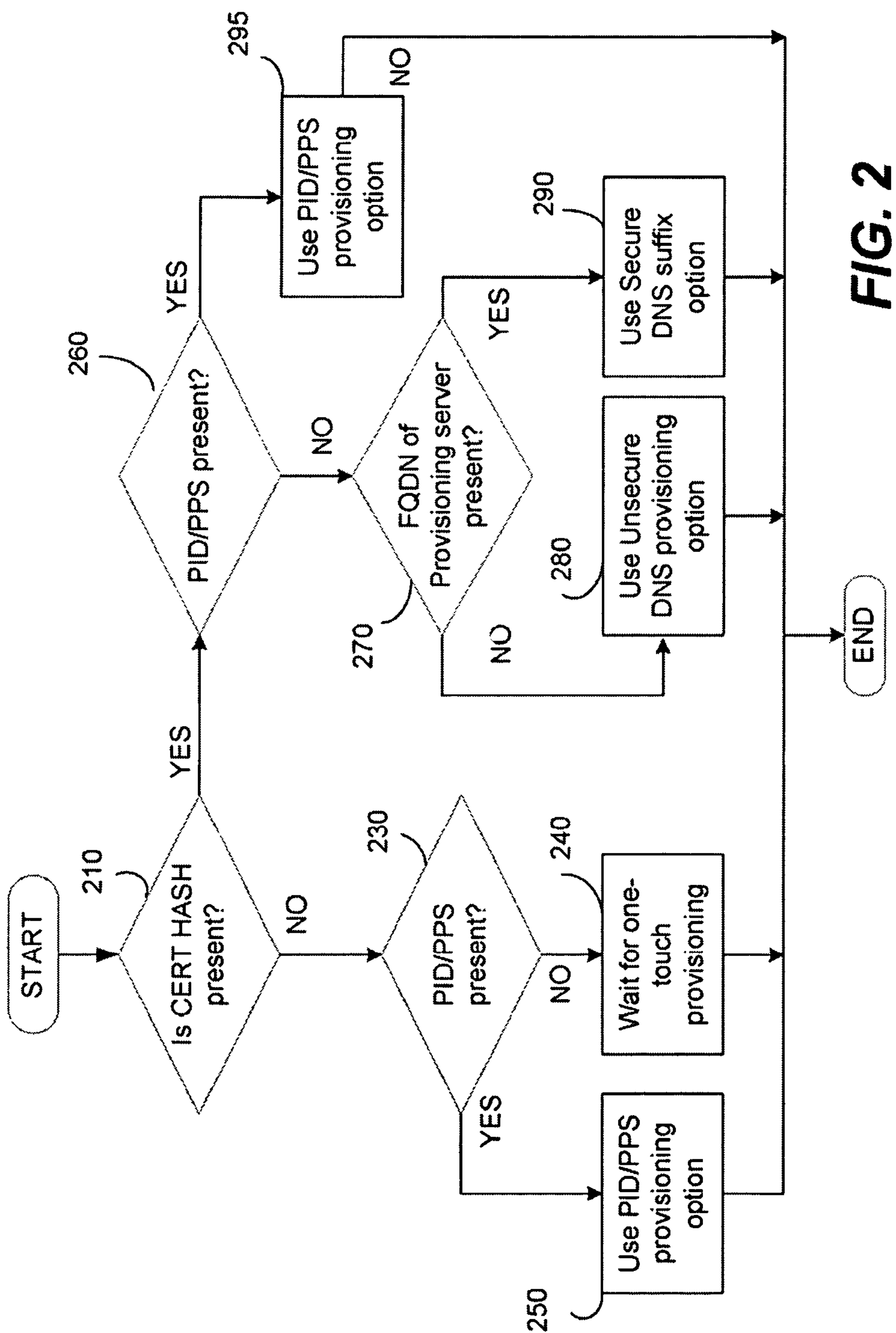
FIG. 2 illustrates an embodiment of a client device 105 performing an option selection procedure for selecting a provisioning approach.

An embodiment of selecting an option to provision AMT on the client device 105 is depicted in FIG. 2. In block 210, the active management unit 153 may determine whether a certificate hash is present in the NVRAM 157 and control passes to block 230 if the certificate hash is not present and to block 260 otherwise. In one embodiment, the certificate hash may include a cryptographic hash of an X509v3_Root certificate, which is trusted. In one embodiment, the active management unit 153 may compare the hash value of the Root certificate of the certificate chain that is provided by the provisioning server 180 with the certificate hashes stored in the NVRAM 157. If a match is not found control passes to block 230 and to block 260 otherwise. In one embodiment, an original equipment manufacturer (OEM) may store SHA-1 certificate hashes in the NVRAM 157. The SHA-1 certificate hashes may be used in security applications and protocols, including transport layer security (TLS), secure socket layer (SSL), IPsec and similar other cryptographic protocols. In one embodiment, the OEMs may generate certificate hashes or may use the certificate hashes provided by the platform vendor. In one embodiment, the OEM may store an image of the certificate hashes in the NVRAM 157 before shipping the client device 105 to the end user.

In block 230, the active management unit 153 may check whether the PID/PPS values are available and control passes to block 240 if the PID/PPS values are not available and to block 250 if the PID/PPS values are available. In one embodiment, the OEM may store the PID/PPS values in the BIOS 158 before shipping the client device 105 to the end user.

In block 240, the active management unit 153 may wait for one touch provisioning, which may begin at the IT staging area of the corporate IT departments. In block 250, the active management unit 153 may initiate PID/PPS provisioning option described in FIG. 6 and FIG. 7 below.

In block 260, the active management unit 153 may check for the presence of PID/PPS values and control passes to block 270 if the PID/PPS values are not present and to block 295 if the PID/PPS values are present. In one embodiment, the OEM may store the PID/PPS values in the BIOS 158 before shipping the client 105 to the end user.

In block 270, the active management unit 153 may check whether a set-up value such as a fully qualified domain name (FQDN) of the provisioning server 180 is available. In one embodiment, the OEM may store the FQDN of the provisioning server 180 in the BIOS 158. Control passes to block 280 if the FQDN of the provisioning server 180 is not present in the BIOS 158 and to block 295 if the FQDN is present in the BIOS 158.

In block 280, the active management unit 153 may use unsecure DNS provisioning option described in FIG. 3 below. In block 290, the active management unit 153 may use secure DNS provisioning option described in FIG. 4 and 5 below. In block 295, the active management unit 153 may use PID/PPS provisioning option described in FIG. 6 and 7 below.

Figure 3:
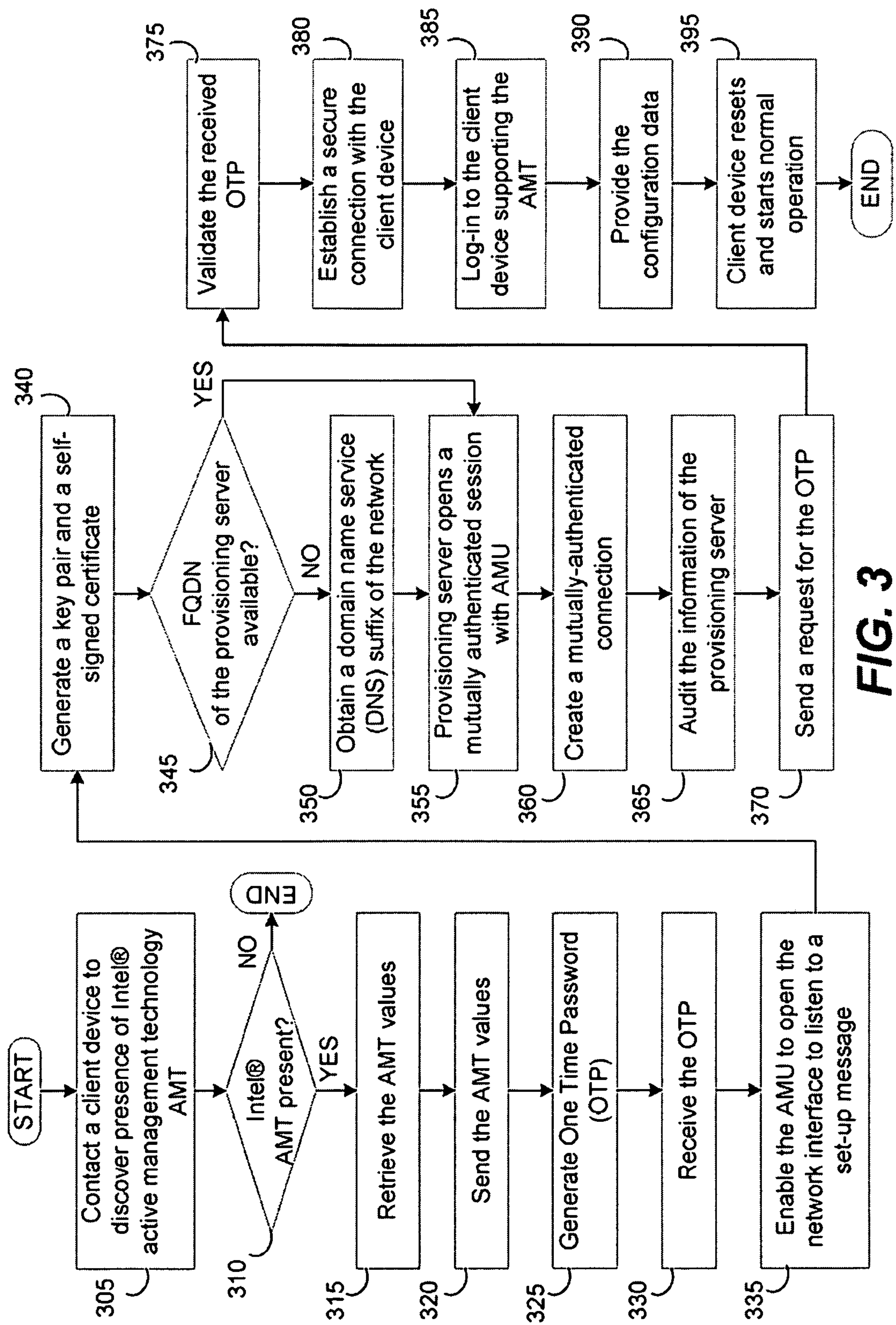
FIG. 3 illustrates a flow-chart depicting an unsecured DNS suffix option for provisioning AMT in the client device.

An embodiment of provisioning AMT using unsecure DNS option is illustrated in flow-chart of FIG. 3. In one embodiment, the unsecure DNS provisioning option may be used to provision the client device 105 after the operating system 120 is installed. In block 305, the management console 190 may contact the client device 105 to discover the presence of active management technology (AMT). In one embodiment, the management console 190 may send an update request.

In block 310, the management agent 125 may determine whether the client device 105 comprises AMT. In one embodiment, the management agent 125 may initiate the driver 135, which may interface with the chipset 155 to determine if the chipset 155 is AMT enabled. In one embodiment, the driver 135 may send an enquiry packet to the chipset 155 and may receive a response packet comprising a status bit, the status of which may indicate the presence of AMT. If the chipset 155 comprises AMT, control passes to block 315 and the provisioning approach ends otherwise.

In block 315, the management agent 125 may retrieve AMT values from the active management unit 153. In one embodiment, the management agent 125 may initiate the driver 135, which may send a query to the active management unit 153, which may retrieve AMT information from the NVRAM 157 and the BIOS 158. In one embodiment, the driver 135 may comprise a management engine interface (MEI) or HECI driver. In one embodiment, the AMT values may comprise AMT values such as configuration mode, configuration state, AMT version and similar other values. In one embodiment, the management agent 125 may receive a universally unique identifier (UUID), AMT version, and similar other values. In one embodiment, the UUID may uniquely identify the client device 105 independent of the installation status of the operating system 120.

In block 320, the management agent 125 may send the AMT values to the management console 190. In one embodiment, the AMT values may be used by the management console 190 to determine whether the client device 105 supports the AMT. In one embodiment, the management console 190 may forward the AMT values to the provisioning server 180.

In block 325, the management console 190 may generate one time password (OTP), which may be sent to the management agent 125 and the provisioning server 180. In one embodiment, the OTP may be generated if the client device 105 is shipped from the OEM with AMT set in 'Listen mode'. In one embodiment, the OTP may be used by the provisioning server 180 to authenticate the client device 105.

In block 330, the management agent 125 may receive the OTP and store the OTP in the NVRAM 157.

In block 335, the management agent 125 may enable the active management unit 153 to open the network interface to receive a set-up message.

In one embodiment, the management agent 125 may send a command such as AMTEnableNetworkSetupListen( ) command to enable the AMU 153 to open a port and listen to the setup message such as the transport layer security (TLS) setup message. In one embodiment, the active management unit 153 may obtain the IP address of the client device 105 after the network interface is open.

In block 340, the active management unit 153 may generate a key pair and a self signed certificate. In one embodiment, the key pair and the self-signed certificate may be used to provide a protected channel between the provisioning server 180 and the client device 105. In one embodiment, the active management unit 153 may execute a certificate generation code to generate the key pair and the self-signed certificate. In one embodiment, the active management unit 153 may generate a RSA private and public key pair with 2048 bit modulus and a self signed certificate (X.509v3) using the RSA private and public key pair. In one embodiment, the active management unit 153 may store the key pair and the signed certificate in a private data area within the AMU 153.

In one embodiment, the active management unit 153 may set a bit such as the AMTProvKeyGenSuccessful as TRUE after generation of the key pair and the signed certificate.

In block 345, the active management unit 153 may check whether a set-up value such as the FQDN of the provisioning server 180 is available and control passes to block 350 if the FQDN is not available and to block 355 otherwise.

In block 350, the active management unit 153 may obtain the DNS suffix of the network 160. In one embodiment, the active management unit 153 may obtain the DNS suffix from the DHCP server 165. In one embodiment, the active management unit 153 may use Option 15 of DHCP to obtain the DNS suffix. In one embodiment, the active management unit 153 may locate the provisioning server 180's IP address using the DNS suffix. In one embodiment, the active management unit 153 may send a 'hello' packet to the provisioning server 180. In one embodiment, the hello packet may comprise the AMT values of the client device 105.

In block 355, the provisioning server 180 may open a mutually authenticated session with the active management unit 153 of the client device 105. In one embodiment, the provisioning server 180 may open a transport layer security (TLS) mutually authenticated session with the active management unit 153.

In block 360, the provisioning server 180 may create a mutually authenticated connection with the active management unit 153. In one embodiment, the provisioning server 180 and the client device 105 may establish a mutually authenticated connection using TLS handshake protocol. As a part of the TLS handshake protocol, in one embodiment, the active management unit 153 may send the self signed certificate to the provisioning server 180 and in response the provisioning server 180 may receive a certificate chain including the root of trust certificate from the provisioning server 180.

In one embodiment, the active management unit 153 may compute the hash of the root of trust certificate and validate the certificate chain by matching the hash value with the list of hash values stored in the NVRAM 157. In one embodiment, the active management unit 153 may validate the DNS suffix by matching the DNS suffix in the FQDN of the provisioning server 180 with the DNS suffix obtained from the DHCP server 165 in block 350. In one embodiment, the active management unit 153 may also validate the certificate usage to verify if the certificate chain was meant for provisioning AMT. In one embodiment, the active management unit 153 may also check the provisioning server authentication to verify whether the AMU 153 is communicating with an appropriate provisioning server. If the above validations succeed, the active management unit 153 may trust the provisioning server 180. Such an approach may mitigate the chance of a rouge provisioning server authenticating as the provisioning server 180.

In block 365, the active management unit 153 may audit the information of the provisioning server 180. In one embodiment, the AMT firmware may maintain an audit record of each provisioning attempt. In one embodiment, active management unit 153 may write the audit information into the NVRAM 157. In one embodiment, the audit information may comprise a first field (bits 1-2: denote the method; bit-3: denote the mode-Talk/Listen; and bits 4-8: Reserved), a second field of 256 bytes to store FQDN of provisioning server 180 as stored in the certificate, a third field of 20 bytes to store hash value of the trusted root certificate, a fourth field comprising three 16 byte array for storing intermediate certificate authority's serial numbers, a fifth field of 1 bit to denote the hash algorithm used to generate the above hash value, a sixth field to denote the time/date of the TLS session establishment, a seventh field to denote the IP address of the provisioning server 180, and a eighth field to denote whether the certificate passed time validity check.

In block 370, the provisioning server 180 may request the active management unit 153 to send the OTP received in block 330. In block 375, the provisioning server 180 may validate the OTP received from the active management unit 153. In one embodiment, the provisioning server 180 may compare the OTP received from the management console 190 in block 325 with the OTP received from the active management unit 153.

In block 380, the provisioning server 180 may establish a secure connection with the client device 105. In one embodiment, the provisioning server 180 may use TLS or TLS-PSK (pre-shared key) to establish a secure connection with the client device 105.

In block 385, the provisioning server 180 may log-in to the client device 105 using factory default values such as the HTTP digest network administrator username and password.

In block 390, the provisioning server 180 may provide configuration data such as the PID/PPS certificate, private keys, current date and time, HTTP digest credentials and HTTP negotiable credentials. In block 395, the client device 105 may reset and start the normal operation.

In one embodiment, the active management unit 153 may also use secure DNS option for provisioning AMT on the client device 105. While using the secure DNS option, the AMU 153 may use the FQDN of the provisioning server 180 provided to the end-user by the OEM under the purchase contract. In one embodiment, the FQDN may be stored in the NVRAM 157 by the OEM during custom manufacturing. Such an approach may provide a secure provisioning of AMT by avoiding the AMU 153 from obtaining the DNS suffix from the DHCP server 165 as indicated in the block 350 above.

Figure 4:
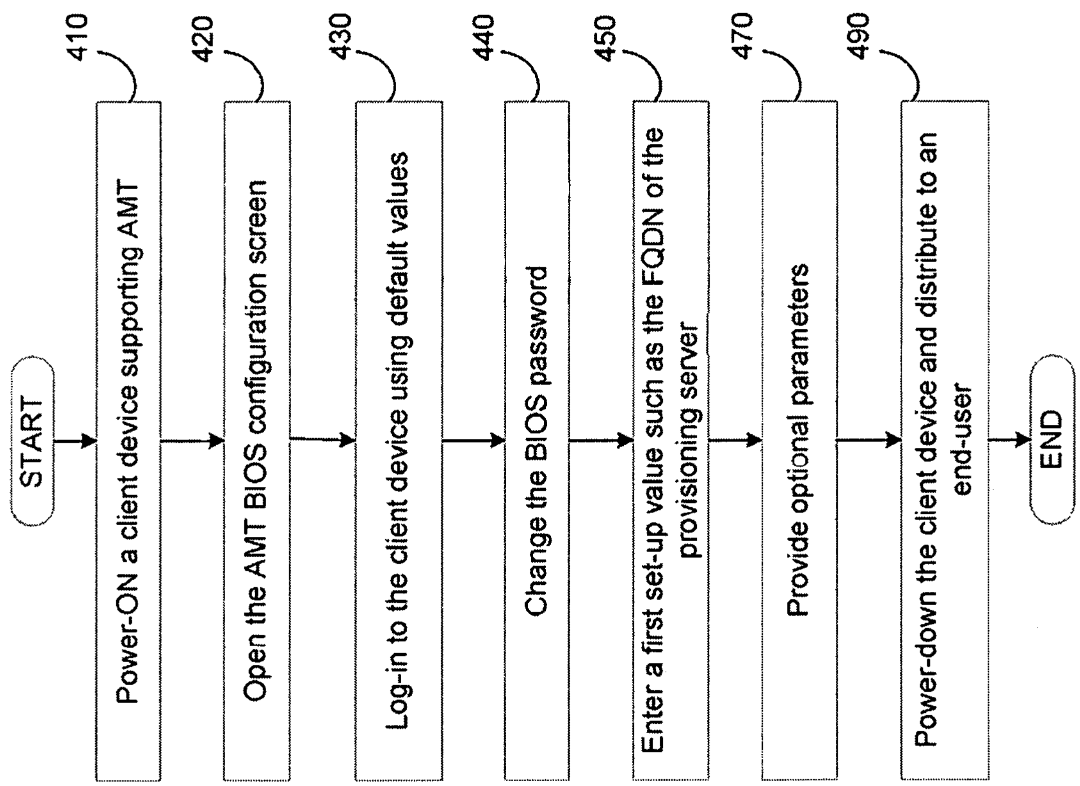
FIG. 4 illustrates a flow-chart depicting the operation performed at the IT staging area while provisioning AMT in the client device using the secured DNS suffix option.

An embodiment of provisioning AMT on a client device 105 at the IT staging area using secure DNS option is illustrated in flow-chart of FIG. 4. In one embodiment, the secure DNS option may comprise a first portion performed at the IT staging area and a second portion performed at the end-user area.

In block 410, the technician at the IT staging area may power-ON the client device 105 by coupling the client device 105 to a power source.

In block 420, the technician may open the AMT BIOS configuration screen. In one embodiment, the technician may use the function keys to open the AMT BIOS configuration screen.

In block 430, the technician may log-in to the AMT environment using the factory default settings such as the administrator user name and password.

In block 440, the technician may change the BIOS password. In block 450, the technician may provide a set-up value such as the FQDN of the provisioning server 180. In one embodiment, the FQDN may be provided by the OEM.

In block 470, the technician may provide optional parameters. In one embodiment, the technician may, optionally, enable the AMT in 'Talk' mode to support bare metal provisioning. In one embodiment, the technician may enter the one-time password (OTP) provided by the provisioning server 180. In one embodiment, the technician may also modify the list of trusted certificate hashes based on the IT policy of the organization.

In block 490, the technician may power-down the client device 105 and distribute the client device 105 to the end-user. In one embodiment, the technician may automate the process of providing the set-up parameters using a universal serial bus (USB) stick. In other embodiment, the set-up parameters may be programmed into AMT flash device such as the NVRAM 157 and the BIOS 158 on the OEM manufacturing floor.

Figure 5:
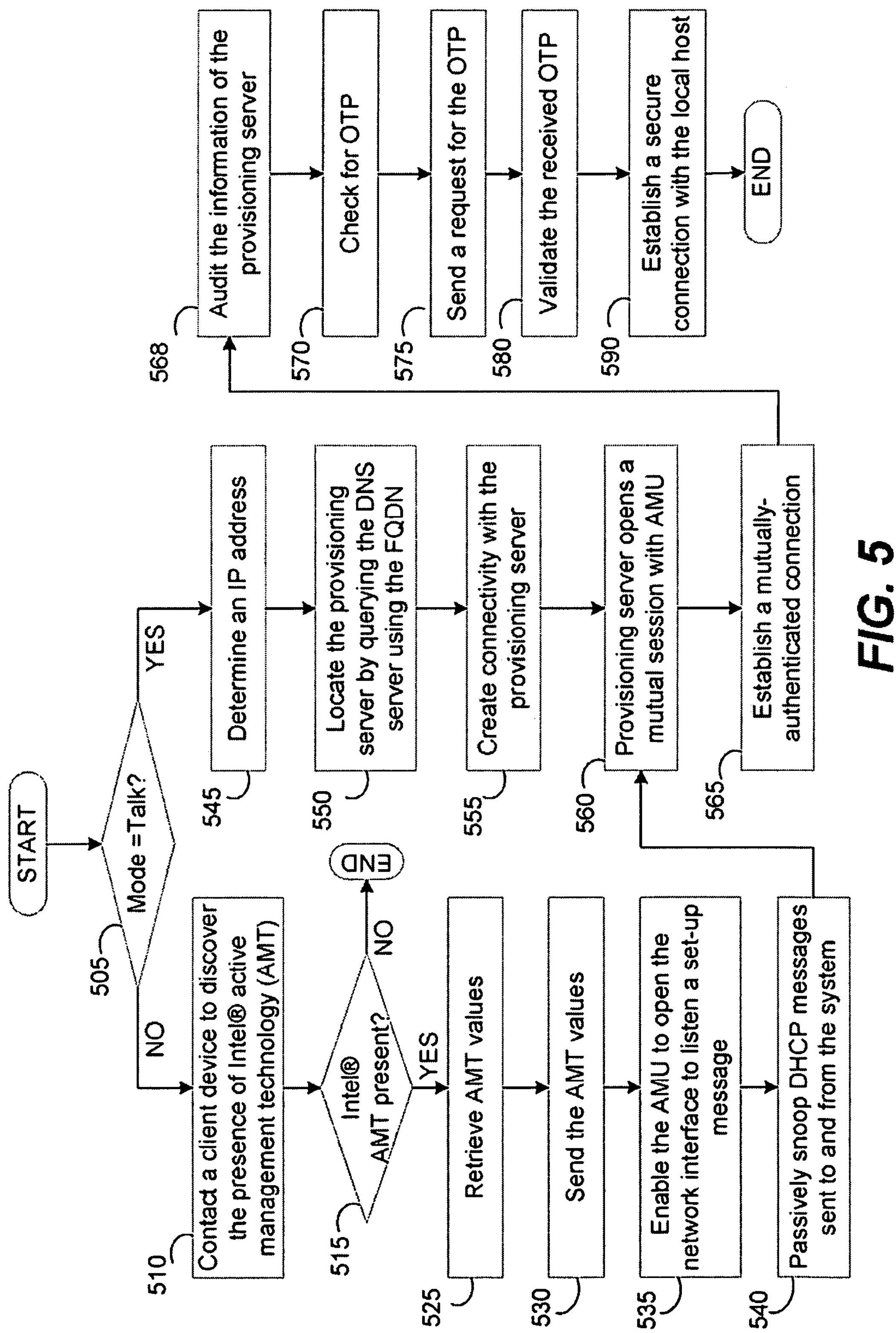
FIG. 5 illustrates a flow-chart depicting the operation performed at the end user area while provisioning AMT in the client device using the secured DNS suffix option.

An embodiment of provisioning AMT at the end user area using secure DNS option is illustrated in flow-chart of FIG. 5. After the first portion is complete at the IT staging area, the client device 105 may be provided to the end-user. In one embodiment, the blocks 505 to 580 may be performed at the end-user area.

In block 505, the management console 190 may check whether the AMT supported by the client device 105 is in Talk mode and control passes to block 510 if the client device 105 is not in Talk mode and to block 545 otherwise. In one embodiment, the Talk vs. Listen mode is set as an internal state in the client device 105.

In block 510, the management console 190 may contact the client device 105 to discover the presence of active management technology (AMT). In one embodiment, the management console 190 may send an update request.

In block 515, the management agent 125 may determine whether the client device 105 comprises AMT. In one embodiment, the management agent 125 may initiate the driver 135, which may interface with the chipset 155 to determine if the chipset 155 is AMT enabled. In one embodiment, the driver 135 may send an enquiry packet to the chipset 155 and may receive a response packet comprising a status bit, which may indicate the presence of AMT. If the client device 105 comprises AMT, control passes to block 525 and the provisioning approach ends otherwise.

In block 525, the management agent 125 may retrieve AMT values from the active management unit 153. In one embodiment, the management agent 125 may initiate the driver 135 to collect the AMT values from the active management unit 153. In one embodiment, the driver 135 may send a collect AMT values signal to the AMU 153. In one embodiment, the AMU 153 may retrieve AMT values from the NVRAM 157 and the BIOS 158 in response to receiving the collect AMT values signal from the driver 135. In one embodiment, the AMT values may comprise values representing configuration mode, configuration state, AMT version and similar other values. In one embodiment, the management agent 125 may receive a universally unique identifier (UUID), AMT version, and similar other values. In one embodiment, the UUID may uniquely identify the client device 105 independent of the installation status of the operating system 120.

In block 530, the management agent 125 may send the AMT values to the management console 190. In one embodiment, the AMT values sent to the management console 190 may be forwarded to the provisioning server 180.

In block 535, the management agent 125 may enable the active management unit 153 to open the network interface to receive a set-up message. In one embodiment, the management agent 125 may send a command such as AMTEnableNetworkSetupListen( ) command to enable the AMU 153 to open the network interface or a port and listen to the setup message such as the transport layer security (TLS) setup message on the network interface.

In block 540, the active management unit 153 may passively snoop the DHCP messages to obtain the DNS suffix of the network 160 to which the client device 105 is coupled. In one embodiment, the host operating system supported by the client device 105 may actively communicate with the DHCP server 170 and the AMU 153 may passively snoop the DHCP messages to learn DHCP information. In one embodiment, the DHCP snooping may prevent rouge DHCP servers, elimination of DHCP broadcast request visibility, and protection against DHCP server address exhaustion attacks.

In block 545, the active management unit 153 may determine the IP address of the client device 105. In one embodiment, the active management unit 153 may send a request to the DHCP server 165 and may receive the IP address from the DHCP server 165. In one embodiment, the block 545 is reached if the active management unit 153 is set-up in Talk mode. In one embodiment, the bare-metal provisioning approach may be used if the active management 153 is set in Talk mode.

In block 550, the active management unit 153 may locate the provisioning server 180 by querying the DNS server 170 using the FQDN of the provisioning server 180 provided in block 450.

In block 555, the active management unit 153 may create connectivity with the provisioning server 180. In one embodiment, the active management unit 153 may establish a TCP connection with the provisioning server 180 and may send a hello packet comprising the IP address of the client device 105, PID value, UUID, ROM and Firmware version numbers, and such other similar values to the provisioning server 180.

In block 560, the provisioning server 180 may open a mutually authenticated session with the active management unit 153 of the client device 105. In one embodiment, the provisioning server 180 may open a transport layer security (TLS) mutually authenticated session with the active management unit 153.

In block 565, the provisioning server 180 may establish a mutually authenticated connection with the active management unit 153. In one embodiment, the mutually authenticated connection may be established using TLS handshake protocol. As a part of the TLS handshake protocol, in one embodiment, the active management unit 153 may send the self signed certificate to the provisioning server 180 and may receive a certificate chain including the root of trust certificate from the provisioning server 180.

In one embodiment, the active management unit 153 may compute the hash of the root of trust certificate and validate the certificate chain by matching the hash value with the list of hash values stored in the NVRAM 157. In one embodiment, the active management unit 153 may validate the DNS suffix by matching the DNS suffix in the FQDN of the provisioning server 180 with the DNS suffix obtained from the DHCP server 165. In one embodiment, the active management unit 153 may also validate the certificate usage to verify if the certificate chain was meant for provisioning AMT. In one embodiment, the active management unit 153 may also check the server authentication. If the above validations succeed, the active management unit 153 may trust the provisioning server 180. Such an approach may mitigate the chance of a rouge provisioning server authenticating as the provisioning server 180.

In block 568, the active management unit 153 may audit the information of the provisioning server 180. In one embodiment, the AMT firmware may maintain an audit record of the last provisioning attempt. In one embodiment, active management unit 153 may write the audit information into the NVRAM 157.

In block 570, the provisioning server 180 may search the database to check if OTP is set for the client device 105. In one embodiment, the provisioning server 180 may set the OTP based on the enterprise policy.

In block 575, the provisioning server 180 may request the active management unit 153 to send the OTP provided to the client device 105 in block 470. In block 580, the provisioning server 180 may validate the OTP received from the active management unit 153. In one embodiment, the provisioning server 180 may compare the OTP retrieved from the database with the OTP received from the active management unit 153.

In block 590, the provisioning server 180 may establish a secure connection with the client device 105. In one embodiment, the provisioning server 180 may use TLS or TLS-PSK (pre-shared key) to establish a secure connection with the client device 105.

Figure 6:
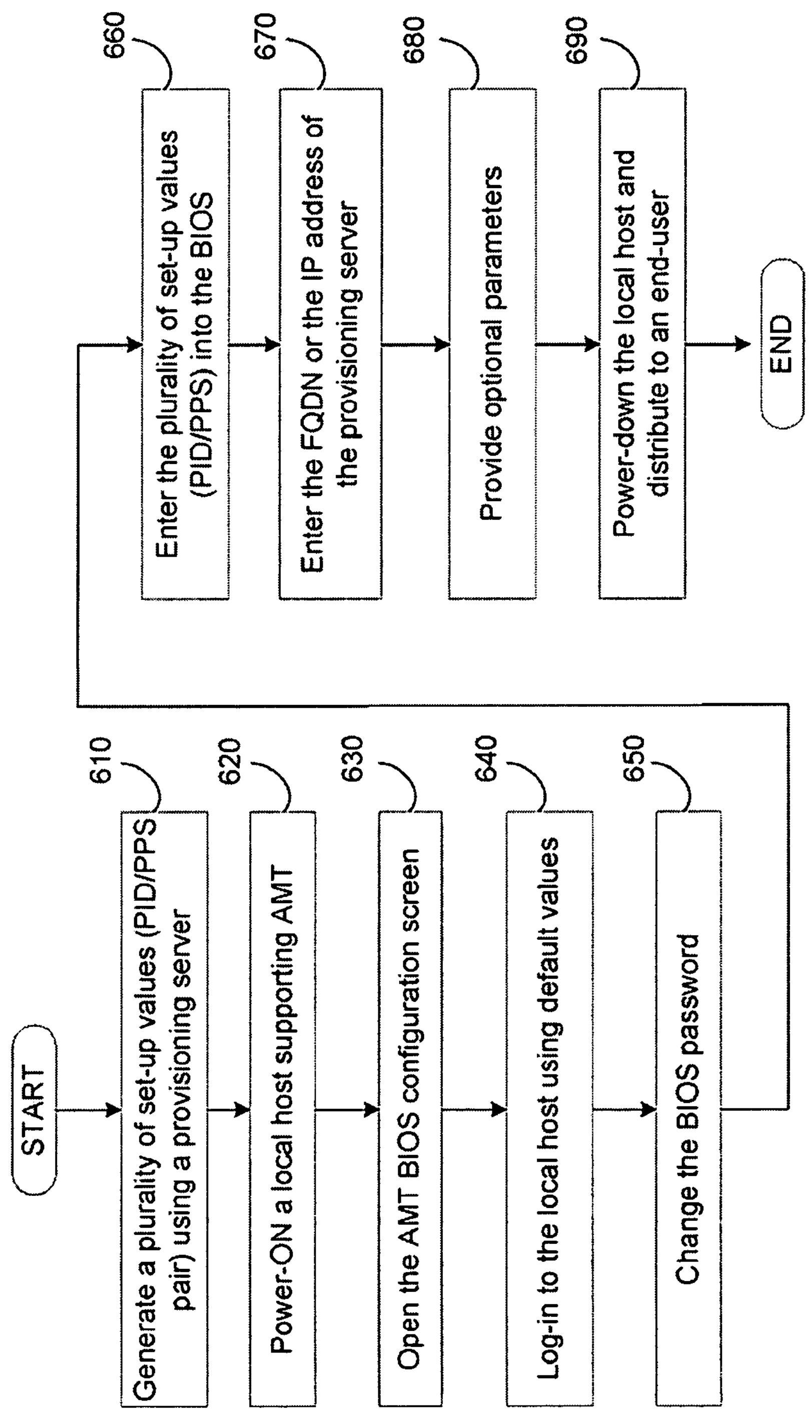
FIG. 6 illustrates a flow-chart depicting the operation performed at the IT staging area while provisioning AMT in the client device using the PID/PPS option.

An embodiment of provisioning AMT on the client device 105 at the IT staging area using PID/PPS option is illustrated in flow-chart of FIG. 6.

In block 610, the technician may request the provisioning server 180 to generate set-up values such as the PID/PPS pair. In one embodiment, the provisioning server 180 may generate a second set-up value such as a provisioning identifier (PID), which may be a public portion of the pre-shared key and a third set-up value such as the provisioning passphrase (PPS) a private portion of the pre-shared key.

In block 620, the technician at the IT staging area may power-ON the client device 105. In block 630, the technician may open the AMT BIOS configuration screen. In one embodiment, the technician may use the function keys to open the AMT BIOS configuration screen.

In block 640, the technician may log-in to the AMT environment using the factory default settings such as the administrator user name and password.

In block 650, the technician may change the BIOS password. In block 660, the technician may enter the second and third set-up values such as the PID/PPS pair into the BIOS. In one embodiment, the technician may enter the PID/PPS pair generated by the provisioning server 180 in block 610.

In block 670, the technician may also enter a first set-up value such as the FQDN or the IP address of the provisioning server 180. In one embodiment, the FQDN or the IP address may be stored in the NVRAM 157. In one embodiment, the FQDN may be provided by the OEM.

In block 680, the technician may provide optional set-up parameters. In one embodiment, the technician may, optionally, enable the AMT in 'Talk' mode to support bare metal provisioning. In one embodiment, the technician may enter the one-time password (OTP) provided by the provisioning server 180. In one embodiment, the technician may also modify the list of trusted certificate hashes based on the IT policy of the organization.

In block 690, the technician may power-down the client device 105 and distribute the client device 105 to the end-user. In other embodiment, the technician may automate the process of providing the set-up parameters to the active management unit 153 using a universal serial bus (USB) stick. In other embodiments, the set-up parameters may be programmed into AMT flash device such as the NVRAM 157 and the BIOS 158 on the OEM manufacturing floor.

Figure 7:
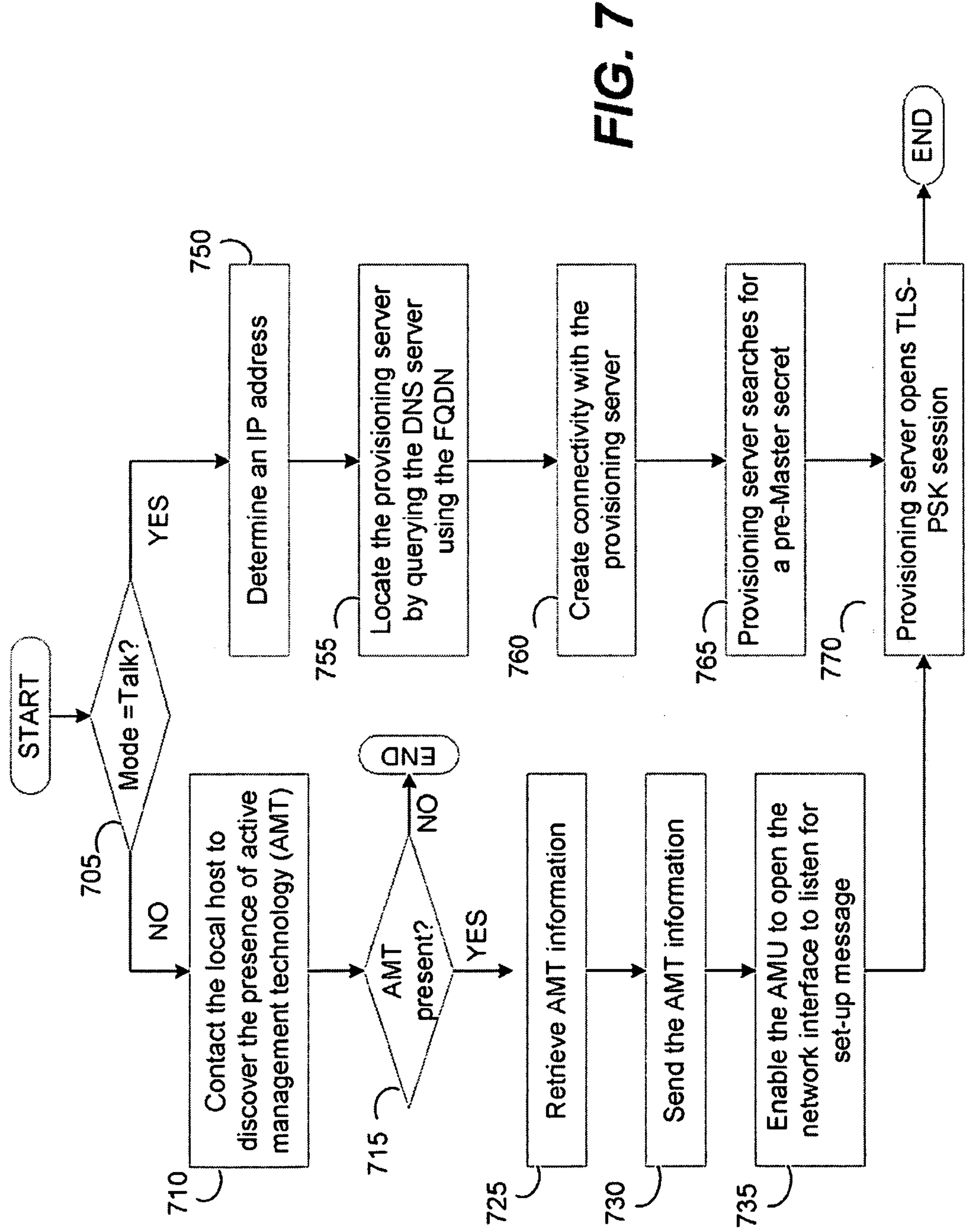
FIG. 7 illustrates a flow-chart depicting the operation performed at the end user area while provisioning AMT in the client device using the PID/PPS option.

An embodiment of provisioning AMT at the end user area using PID/PPS option is illustrated in flow-chart of FIG. 7.

In block 705, the management console 190 may check whether the AMT supported by the client device 105 is in Talk mode and control passes to block 710 if the client device 105 is not in Talk mode and to block 750 otherwise.

In block 710, the management console 190 may contact the client device 105 to discover the presence of active management technology (AMT). In one embodiment, the management console 190 may send an update request.

In block 715, the management agent 125 may determine whether the client device 105 comprises AMT. In one embodiment, the management agent 125 may initiate the driver 135, which may interface with the chipset 155 to determine if the chipset 155 is AMT enabled. In one embodiment, the driver 135 may send an enquiry packet to the chipset 155 and may receive a response packet comprising a status bit, the status of which may indicate the presence of AMT. If the client device 105 comprises AMT, control passes to block 725 and the provisioning approach ends otherwise.

In block 725, the management agent 125 may retrieve AMT values from the active management unit 153. In one embodiment, the management agent 125 may initiate the driver 135, which may send queries to the active management unit 153, which may retrieve AMT values from the NVRAM 157 and the BIOS 158. In one embodiment, the AMT values may comprise configuration mode, configuration state, AMT version and such other similar values. In one embodiment, the management agent 125 may receive a universally unique identifier (UUID), AMT version, and similar other values. In one embodiment, the UUID may uniquely identify the client device 105 independent of the installation status of the operating system 120.

In block 730, the management agent 125 may send the AMT values to the management console 190. In one embodiment, the management console 190 may forward the AMT values to the provisioning server 180.

In block 735, the management agent 125 may enable the active management unit 153 to open the network interface to receive a set-up message.

In one embodiment, the management agent 125 may send a command such as AMTEnableNetworkSetupListen( ) command to enable the AMT to open its network interface and listen to the setup message. In one embodiment, the set-up message may comprise a transport layer security (TLS) setup message on the network interface.

In block 750, the active management unit 153 may determine the IP address of the client device 105. In one embodiment, the active management unit 153 may send a request to the DHCP server 165 and may retrieve the IP address from the response received from the DHCP server 165.

In one embodiment, the block 750 is reached if the active management unit 153 is configured in Talk mode. In one embodiment, the bare-metal provisioning approach may be used if the active management 153 is set in Talk mode.

In block 755, the active management unit 153 may locate the provisioning server 180 by querying the DNS server 170 using the FQDN of the provisioning server 180 provided in block 670.

In block 760, the active management unit 153 may establish connectivity with the provisioning server 180. In one embodiment, the active management unit 153 may establish a TCP connection with the provisioning server 180 and may send a hello packet comprising the IP address of the client device 105, PID, UUID, ROM and Firmware version numbers, and such other similar values to the provisioning server 180.

In block 765, the provisioning server 180 may search for a pre-master secret. In one embodiment, the pre-master secret may be used to generate a master key and session keys.

In block 770, the provisioning server 180 may open a transport layer security (TLS) pre-shared key (PSK) TLS-PSK session with the active management unit 153 of the client device 105. In one embodiment, the pre-shared key may comprise a public portion and a private portion. In one embodiment, the public portion may comprise a provisioning identifier (PID) of the pre-shared key and the private portion may comprise a provisioning passphrase (PPS) of the pre-shared key.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:

selecting a zero-touch provisioning feature using an unsecured domain name server option in response to determining that a certificate hash is present and a provisioning pre-shared key is not present, wherein the zero-touch provisioning feature using the unsecured domain name server option includes, sending an update command to a client device to check whether the client device supports provisioning, generating a one-time password in a management console after receiving active management technology values from the client device, storing the one-time password in a provisioning server and the client device, instructing an active management unit to open a network interface to listen to a set-up message, identifying the provisioning server if a fully qualified domain name is not available, authenticating the client device using the one-time password by receiving the one-time password from the client device, and matching the one-time password received from the client device with the one-time password stored in the provisioning server, authenticating the provisioning server using a certificate chain by providing a self-signed certificate to the provisioning server, wherein the self-signed certificate and a key-pair is generated by the client device, receiving the set-up message comprising a certificate chain over the network interface, wherein the certificate chain includes a root of trust, and matching a hash value of the certificate chain with a plurality of stored hash values, auditing the provisioning server, and establishing a secure connection between the client device and the provisioning server, wherein the zero-touch provisioning feature enables the secure connection to be established between the client device and the provisioning server without initiation from a user of the client device.

2. The method of claim 1, wherein the one-time password is generated if the client device is configured to listen to the set-up message.

3. The method of claim 1, identifying the provisioning server further comprises obtaining a domain name server suffix from a dynamic host configuration protocol server.

4. The method of claim 1 further comprises using a transport layer security protocol to establish an authenticated connection between the client device and the provisioning server.

5. The method of claim 1, wherein auditing the provisioning server comprises maintaining a record of a plurality of parameters of a session with the provisioning server.

6. The method of claim 1, wherein identifying the provisioning server comprises locating the provisioning server by querying a domain naming server using the fully qualified domain name that is available.

7. A computing device comprising:

a processor to support a management agent, wherein the management agent is to send active management technology values to a management console after receiving an update request from the management console, and a chipset coupled to the processor, wherein the chipset is to, select a zero-touch provisioning feature using an unsecured domain name server option in response to determining that a certificate hash is present and a provisioning pre-shared key is not present, provide the active management technology values to the management agent, store a one-time password in a non-volatile memory after receiving the one-time password from the management console, instruct an active management unit to open a network interface to listen to a set-up message, identify a provisioning server if a fully qualified domain name is not available, authenticate the provisioning server using a certificate chain, and audit the provisioning server before establishing a secure connection with the provisioning server, wherein the zero-touch provisioning feature enables the secure connection to be established between the computing device and the provisioning server without initiation from a user of the client device;

wherein the active management unit is to provide a self-signed certificate to the provisioning server, receive from the provisioning server the set-up message comprising a certificate chain over the network interface, wherein the certificate chain includes a root of trust, and match a hash value of the certificate chain with a plurality of stored hash values.

8. The computing device of claim 7 further comprises a non-volatile memory, wherein the non-volatile memory is to store the one-time password if the computing device is configured to listen to the set-up message.

9. The computing device of claim 7 the chipset is to determine a network address by obtaining a domain name server suffix from a dynamic host configuration protocol server if the fully qualified domain name of the provisioning server is not available.

10. The computing device of claim 7, wherein the active management unit is to use a transport layer security protocol to establish an authenticated connection with the provisioning server.

11. The computing device of claim 7, wherein the chipset is to maintain a record of a plurality of parameters of a session with the provisioning server to audit the provision server.

12. The computing device of claim 7, wherein the chipset is to locate the provisioning server by querying a domain naming server using the fully qualified domain name that is available.

13. The computing device of claim 7 further comprises a network interface, wherein the network interface to, receive the one-time password from the management console, send a signed certificate to the provisioning server, and receive the certificate chain from the provisioning server.

14. A non-transitory machine readable medium comprising a plurality of instructions that in response to being executed result in a computing device:

selecting a zero-touch provisioning feature using an unsecured domain name server option in response to determining that a certificate hash is present and a provisioning pre-shared key is not present, wherein the zero-touch provisioning feature using the un-secured domain name server option includes, sending active management technology values in response to receiving an update command, storing an one-time password in a client device, instructing an active management unit to open a network interface to listen to a set-up message, identifying a provisioning server if a fully qualified domain name is not available, authenticating the client device using the one-time password, authenticating the provisioning server using a certificate chain, wherein authenticating the provisioning server comprises:

providing a self-signed certificate to the provisioning server, wherein the self-signed certificate and a key-pair is generated by the client device, receiving the set-up message comprising a certificate chain over the network interface, wherein the certificate chain includes a root of trust, and matching a hash value of the certificate chain with a plurality of stored hash values, auditing the provisioning server, and establishing a secure connection between the client device and the provisioning server, wherein the zero-touch provisioning feature enables the secure connection to be established between the client device and the provisioning server without initiation from a user of the client device.

15. The non-transitory machine readable medium of claim 14, wherein the one-time password is generated if the client device is configured to listen to the set-up message.

16. The non-transitory machine readable medium of claim 14, identifying the provisioning server further comprises obtaining a domain name server suffix from a dynamic host configuration protocol server.

17. The non-transitory machine readable medium of claim 14 further comprises using a transport layer security protocol to establish an authenticated connection between the client device and the provisioning server.

18. The non-transitory machine readable medium of claim 14, wherein auditing the provisioning server comprises maintaining a record of a plurality of parameters of a session with the provisioning server.

19. The non-transitory machine readable medium of claim 14, wherein identifying the provisioning server comprises locating the provisioning server by querying a domain naming server using the fully qualified domain name that is available.

* * * * *